US005938847A

United States Patent [19]
Akimoto et al.

[11] Patent Number: 5,938,847
[45] Date of Patent: Aug. 17, 1999

[54] METHOD AND APPARATUS FOR COATING A FILM ON AN OBJECT BEING PROCESSED

[75] Inventors: Masami Akimoto, Kumamoto; Kazutoshi Yoshioka, Kumamoto-ken; Kazuo Sakamoto; Norio Semba, both of Kumamoto, all of Japan

[73] Assignee: Tokyo Electron Limited, Tokyo, Japan

[21] Appl. No.: 08/915,737

[22] Filed: Aug. 21, 1997

[30] Foreign Application Priority Data

| | | | |
|---|---|---|---|
| Sep. 3, 1996 | [JP] | Japan | 8-252317 |
| Jan. 16, 1997 | [JP] | Japan | 9-017761 |

[51] Int. Cl.[6] .......... G03G 15/08; G01V 8/00

[52] U.S. Cl. .......... 118/665; 118/712; 250/222.2; 250/574; 356/337

[58] Field of Search .......... 118/712, 52, 319, 118/56, 65; 356/335–338, 343, 441; 250/222.2, 574, 576; 73/36, 53.01, 61.41, 61.71

[56] References Cited

U.S. PATENT DOCUMENTS

| | | | |
|---|---|---|---|
| 5,002,008 | 3/1991 | Ushijima et al. | 118/52 |
| 5,090,808 | 2/1992 | Ishikawa et al. | 356/343 |
| 5,509,375 | 4/1996 | Sayka et al. | 118/712 |

FOREIGN PATENT DOCUMENTS

| | | |
|---|---|---|
| 4-190873 | 7/1992 | Japan . |

*Primary Examiner*—David A. Simmons
*Assistant Examiner*—Calvin Padgett
*Attorney, Agent, or Firm*—Oblon, Spivak, McClelland, Maier & Neustadt, P.C.

[57] ABSTRACT

Disclosed herein is a method and an apparatus for applying a coating liquid to an object from a liquid-applying member at a first prescribed position, thereby forming a film on the object. Before the coating liquid at the first position, the coating liquid is applied at a second predetermined position. An impurity-detecting device detects the impurities contained in the coating liquid applied at the second position. A particle-counting device is provided, and a switching device is provided on a liquid-supplying pipe extending from a source of the coating liquid to the liquid-applying member. The switching device switches the supply of the coating liquid between the liquid-applying member and the impurity-detecting device. The impurities in the coating liquid can thereby monitored.

17 Claims, 9 Drawing Sheets

METHOD AND APPARATUS FOR COATING A FILM ON AN OBJECT BEING PROCESSED

BACKGROUND OF THE INVENTION

The present invention relates to a method of coating a film on an object such as a semiconductor wafer or an LCD substrate, an apparatus for coating a film on such an object, and an apparatus for counting particles existing in the coating liquid.

In the manufacture of a semiconductor device, a circuit pattern is formed by means of so-called photolithography. The photolithography comprises the steps of: coating a photoresist on a semiconductor wafer, exposing the photoresist to light by using a photomask, and developed the photoresist thus exposed to light.

In the photoresist-coating step, the resist liquid is applied on to the center part of the semiconductor wafer from a nozzle located above the wafer, while the wafer held on a spin chuck is spinning at high speed. The resist liquid thus applied spread by virtue of the centrifugal force the wafer exerts while spinning. As a result, a resist film having an uniform thickness is formed on the entire surface of the semiconductor wafer.

The semiconductor wafer with the resist film coated on it is subjected to heat treatment, light-exposure, development and etching. A circuit pattern is thereby formed on the semiconductor wafer. The circuit pattern may not be a desired one if the resist film contains particles.

To form a resist film containing as few particle as possible, a filter is interposed between the nozzle and the resist liquid source to filter out particles from the resist liquid. The efficiency of the filter gradually decrease with time. Hence, the filter may fail to filter out particles after a long use. Unless the filter is replaced with a new one, many particles will remain in the resist liquid.

To decide whether or not the filter should be replaced with a new one, it is necessary to determine how much the efficiency of the filter has decreased. To this end it is required that the particles in the resist liquid be counted before the liquid is applied to semiconductor wafers. It is proposed that the particle counters commercially available be used to count the particles in the resist liquid.

Here arises a problem. The conventional particle counters are designed to count particles existing in low-viscosity liquids such as pure water and hydrofluoric acid, not to count particles in a high-viscosity liquid such as resist liquid which has viscosity of several cP to several hundred cP. If a conventional particle counter is placed between the nozzle and the semiconductor wafer and used for a long time to count particles in the resist liquid applied from the nozzle, the resist liquid sticks to the inner wall of the optical cell of the counter. Much time and labor are required to wash the particle counter. In view of this, the conventional particle counter cannot be used in an in-line fashion as is employed to count particles existing in pure water or hydrofluoric acid.

The counter must therefore be located outside the line of manufacturing semiconductor devices. In this case, the resist liquid must be sampled, and samples must be supplied to the particle counter. This also requires much time and labor.

The conventional particle counter cannot be used to count particles in the resist liquid, for another reason. It applies a light beam, such as a laser beam, to a liquid to count particles existing in the liquid. When the conventional particle counter applies a light beam to the resist liquid, the resist liquid emits light. This makes it difficult for the counter to count particles in the resist liquid with a sufficiently high accuracy.

BRIEF SUMMARY OF THE INVENTION

The first object of the invention is to provide a method of coating a film on a substrate, in which before a coating liquid (e.g., a resist liquid) is applied to the substrate from a liquid-applying member such as nozzle, it is determined whether the coating liquid contains impurities (e.g., particles) in an amount so large as to lower the yield of products to be made by using the film.

The second object of the present invention is to provide an apparatus which performs the film-coating method described above.

The third object of this invention is to provide an apparatus for coating a film on a substrate, in which the particles in the coating liquid used can be counted in in-line fashion.

The fourth object of the present invention is to provide an apparatus for counting the particle in such a coating liquid, in in-line fashion.

A first coating method designed to attain the first object is a method of coating a film on a substrate by applying a coating liquid to the substrate located at a first position. The method comprises the steps of: applying the coating liquid at a second position (generally known as "dummy dispensing position") before applying the coating liquid at the first position; and detecting impurities contained in the coating liquid applied at the second position.

In most cases, the first position is above the center of the substrate. It suffices to set the second position away from the first position. Preferably, the second position should be set in an area not above the substrate, so that the coating liquid applied at the second position may not be applied to the substrate. To detect impurities, if any, contained in the liquid applied at the second position, the liquid may be collected, and a device such as a particle counter may be used to detect the impurities in the collected liquid.

As described above, the coating liquid is applied at the second position before it is applied at the first position, and the impurities contained in the liquid applied in the second position are detected. Hence, before applying the coating liquid to the substrate it can be determined whether too many particles exist in the coating liquid. The impurities may be detected immediately before the liquid is applied in the first position, at regular intervals, or every time the liquid is applied a prescribed number of substrates.

A second coating method designed to attain the first object is a method of coating a film on a substrate by applying a coating liquid to the substrate located at a first position, from one of a plurality of liquid-applying members. This method comprises the steps of: selecting one of the liquid-applying members; applying the coating liquid from the selected liquid-applying member at a second position before applying the coating liquid at the first position; and detecting impurities contained in the coating liquid applied at the second position; and moving the selected liquid-applying member to the first position and applying the coating liquid from the selected liquid-applying member to the substrate, only when the impurities are contained in the liquid in an amount less than a reference value.

Since a plurality of liquid-applying members are used in the second method, any desired one can be selected and used to apply the coating liquid to the substrate.

In the second method, the selected liquid-applying member is moved to the first position and applies the coating liquid to the substrate, only when the impurities are contained in the liquid in an amount less than a reference value. Thus, it can be determined whether or not too many particles exist in the coating liquid, before the coating liquid is applied to the substrate, as in the first method. If the impurities are contained in the liquid in an amount equal to or greater than the reference value, the selected liquid-applying member is not moved to the first position and the coating liquid is not applied to the substrate at all.

A first coating apparatus designed to achieve the second object is an apparatus for coating a film on a substrate by applying a coating liquid from a liquid-applying member to the substrate located at a first position. The apparatus comprises: a receptacle located at a second position, for receiving the coating liquid applied from the liquid-applying member; and a detecting device for detecting impurities contained in the coating liquid applied into the receptacle.

Preferably, the receptacle is located not above the substrate. It may be one which flares at its top. The receptacle may be connected to the detecting device by a tube, a pipe or the like. The detecting device is, for example, a particle counter which uses a laser beam to detect the impurities contained in the coating liquid.

The first apparatus can efficiently perform the fist coating method described above.

Even if a plurality of liquid-applying members, such as nozzles, are used, the first apparatus need not have a plurality of receptacles of the type described above need not be used. Only one receptacle is sufficient, in which case the apparatus is more simple, occupies a smaller space, and can be manufactured at a lower cost than otherwise.

The first apparatus may have a cleaning unit for cleaning a passage extending from at least the receptacle to the detecting device, through which the coating liquid is supplied. Once the passage is cleaned, no coating liquid examined previously remains in the passage. This ensures accurate detection of the impurities contained in the coating liquid now held in the receptacle. If the coating liquid is resist liquid, it suffices to supply solvent into the receptacle through the passage.

A second coating apparatus designed to achieve the second object is an apparatus for coating a film on a substrate by applying a coating liquid from a liquid-applying member to the substrate located at a first position, comprising: a liquid-applying member for applying the coating liquid; a detecting device for detecting impurities contained in the coating liquid; a first pipe connecting a source of the coating liquid to the liquid-applying member; a second pipe connecting the source of the coating liquid to the detecting device; and a switching device provided on the first pipe, for switching supply of the coating liquid between the liquid-applying member and the detecting device.

Unlike the first apparatus, the second apparatus is designed to detect impurities in the coating liquid in so-called in-line fashion. The liquid need not be applied from the liquid-applying member, for the purpose of detecting impurities in it. Without a receptacle, the impurities contained in the liquid can be detected. The switching device may be a switching valve such as a three-way valve. The second apparatus may have a plurality of liquid-applying members and a plurality of coating liquid sources. Even in this case, one pipe suffices to connect the coating liquid sources to the detecting device, and detecting device can examine different coating liquids which are to be applied from the liquid-applying members.

In the second apparatus, too, a cleaning unit may be used to clean a passage extending from at least the receptacle to the detecting device, through which the coating liquid is supplied. Once the passage is cleaned, no coating liquid examined previously remains in the passage. This ensures accurate detection of the impurities contained in the coating liquid now held in the receptacle. If the coating liquid is resist liquid, it suffices to supply solvent into the receptacle through the passage.

A first coating apparatus designed to achieve the third object is an apparatus which comprises: a coating section for coating a resist liquid on an object; a resist liquid source for supplying the resist liquid to the coating section; resist-supplying pipe for supplying the resist liquid from the resist liquid source to the coating section; a sampling pipe branched from the resist-supplying pipe; a valve provided at a node of the sampling pipe and the resist-supplying pipe, for switching supply of the coating liquid between the coating section and the sampling pipe; a particle-counting device for counting particles existing in the resist liquid supplied from the sampling pipe; and means for supplying the cleaning solution to the particle-counting device.

The sampling pipe, the valve, and the solution-supplying means cooperate, supplying the cleaning solution to the particle-counting device to clean the same. This prevents the resist liquid from sticking to the inner wall of the optical cell incorporated in the particle-counting device. Thus cleaned, the particle-counting device can be operated in in-line fashion with high efficiency.

A second coating apparatus designed to achieve the third object is an apparatus comprising: a coating section for coating a resist liquid on an object; a resist liquid source for supplying the resist liquid to the coating section; a plurality of resist-supplying pipes for supplying the resist liquid from the resist liquid source to the coating section; a plurality of sampling pipes branched from the resist-supplying pipes, respectively; a plurality of valves provided at nodes of the sampling pipes on the one hand and the resist-supplying pipes on the other, each for switching supply of the coating liquid between the coating section and one sampling pipe; a measuring pipe to which the sampling pipes are connected; a particle-counting device connected to the measuring pipe, for counting particles existing in the resist liquid supplied from each of the sampling pipes; and means for supplying the cleaning solution to the particle-counting device through the measuring pipe.

In this apparatus, various resist liquids can be supplied into the particle-counting device through the sampling pipes and the measuring pipe. Hence, one particle-counting device suffices to counting the particles existing in various resist liquids flowing through the resist-supplying pipes. Since the cleaning solution supplying means supplies the cleaning solution to the particle-counting device through the measuring pipe, the resist liquid is prevented from sticking to the inner wall of the optical cell incorporated in the particle-counting device. Thus cleaned, the particle-counting device can be operated in in-line fashion with high efficiency.

A third apparatus designed to achieve the third object is an apparatus of the same structure as the first and second apparatuses described above. The particle-counting device incorporated in the third apparatus has a particle-detecting section and a particle-counting section. The particle-counting section is designed to count only particles other than those which the particle-detecting section has detected from light emitted from resist liquid. Hence, the particle-counting device can count particles with high precision, because the particle-detecting section is not influenced by the light emitting from the resist liquid.

A fourth apparatus designed to achieve the third object is an apparatus comprising: a coating section for coating a resist liquid on an object; a resist liquid source for supplying the resist liquid to the coating section; resist-supplying pipe for supplying the resist liquid from the resist liquid source to the coating section; a sampling pipe branched from the resist-supplying pipe; a valve provided at a node of the sampling pipe and the resist-supplying pipe, for switching supply of the coating liquid between the coating section and the sampling pipe; and a particle-counting device for counting particles existing in the resist liquid supplied from the sampling pipe. The particle-counting device has a particle-detecting section and a particle-counting section for counting only particles other than those which the particle-detecting section has detected from light emitted from resist liquid.

The fourth apparatus is advantageous in the same respect as the third apparatus described above.

A fifth apparatus designed to achieve the third object of the present invention is an apparatus of the same structure as the second apparatus described above. The fifth apparatus is characterized in that the particle-detecting section has a relatively low sensitivity and is not influenced by the light emitting from the resin component of the resist liquid. Not influenced by such light, the particle-detecting section can detect particles having sizes over a broad range, serving to count particles in any resist liquid with high accuracy.

A sixth apparatus which is designed to achieve the third object of the invention is an apparatus identical in structure to any one of the first to fifth apparatuses described above. The sixth apparatus is characterized in that a filter is provided on the resist-supplying pipe and located upstream of the node of the sampling pipe and the resist-supplying pipe. Located upstream of that node, the filter can be found to have become less efficient when particles increases in number in the resist liquid.

A first particle-counting apparatus designed to achieve the fourth object of the invention comprises: a particle-detecting section; and a particle-counting section. The particle-counting section counts only particles other than those which the particle-detecting section has detected from light emitted from resist liquid. In other words, the particle-counting section is not influenced by the light emitted from the resist liquid. Hence, the particle-counting device can count particles with high precision.

A second particle-counting apparatus designed to achieve the fourth object of the invention is identical in structure to the first particle-counting apparatus. The second particle-counting apparatus is characterized in that the particle-detecting section has a relatively low sensitivity and is not influenced by the light emitting from the resin component of the resist liquid. The particle-detecting section has such a sensitivity as to detect particles having a size equal to or greater than 0.16 $\mu$m. Not influenced by such light, the particle-detecting section can detect particles having sizes over a broad range, serving to count particles in any resist liquid with high accuracy.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will be described, with reference to FIGS. 1 to 3.

Figure 1:
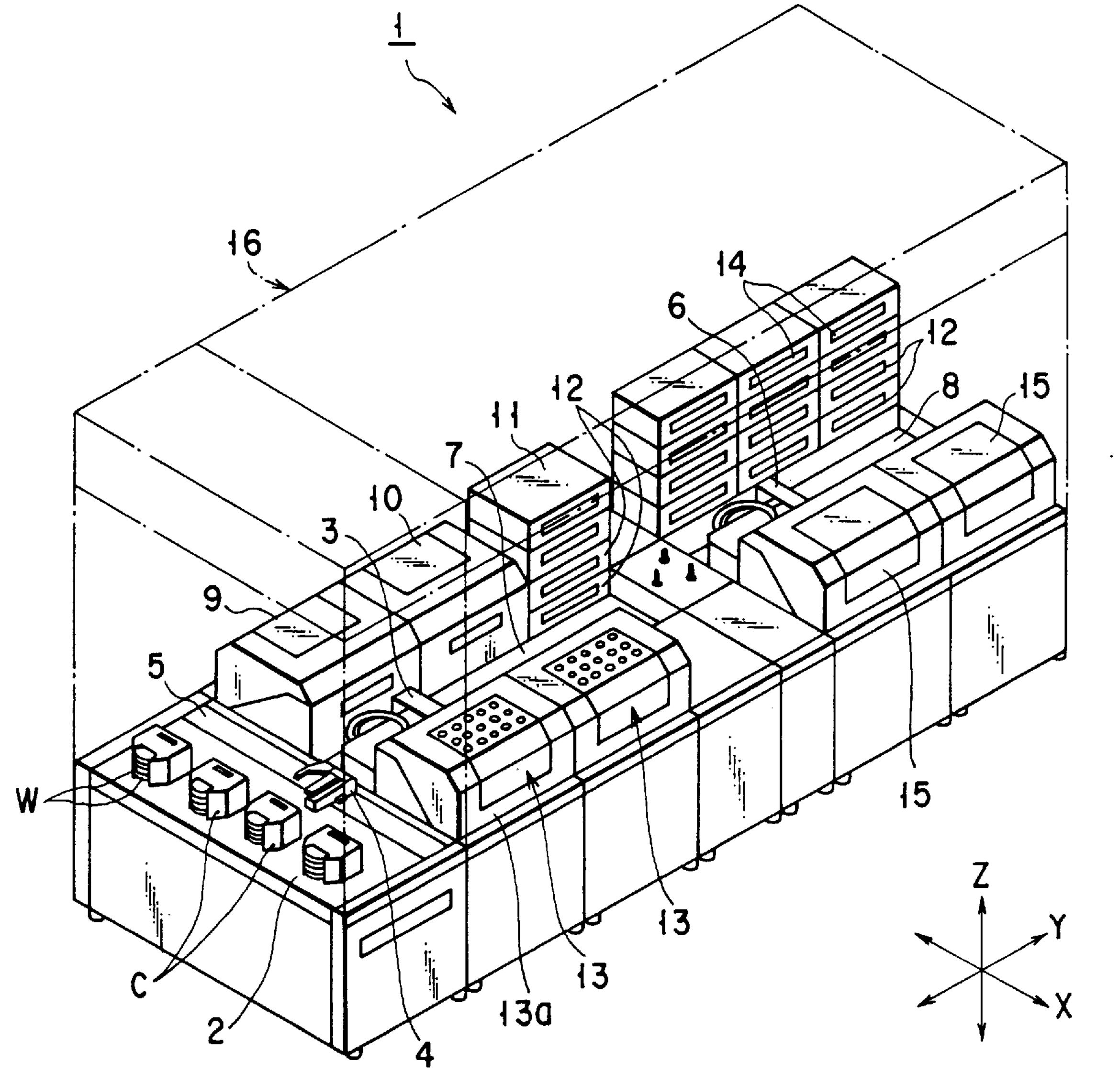
FIG. 1 is a perspective view of a resist-coating and -developing system incorporating a resist liquid coating apparatus which is the first embodiment of the invention.

FIG. 1 shows a resist-coating and -developing system 1. The system 1 is designed to wash semiconductor wafers, adhere resists to the wafers, heat the semiconductor wafers, cool the wafers to a prescribed temperature, expose the wafers to light, develop the resists on the wafers, and heat the wafers after developing the resists.

As shown in FIG. 1, the system 1 comprises a cassette station 2, a first transport arm 3, a transport mechanism 4, a transport path 5, a second transport arm 6, a first arm track 7, and a second arm track 8. Cassettes C, each containing a plurality of wafers W, are aligned on the cassette station 2, along the transport path 5. The transport mechanism 4 can moved along the transport path 5. It is designed to remove the wafers W from the cassettes C and transport them to the first main transport arm 3. The transport arms 3 and 6 can move along the arm tracks 7 and 8, respectively.

The resist-coating and -developing system 1 further comprises various wafer-processing apparatuses. The apparatuses are a brush washing apparatus 9, a water-washing apparatus 10, an adhesion apparatus 11, a cooling apparatus 12, two resist-coating apparatuses 13, a heating apparatus 14, and two developing apparatuses 15. The apparatuses 9, 10, 11, 12 and 14 are arranged on one side of the arm tracks 7 and 8, while the apparatuses 13 and 15 are arranged on the other side of the arm tracks 7 and 8.

The brush washing apparatus 9 rotates wafers W removed from the cassettes C and washes the wafers W. The water-washing apparatus 10 applies water in the form of a high-pressure jet, to the surfaces of the wafers W, thereby washing the wafers W. The adhesion apparatus 11 renders each wafer W hydrophobic at a surface, making a resist firmly adhere to the surface. The cooling apparatus 12 cools the wafers W to a predetermined temperature. The resist-coating apparatuses 13 apply a resist liquid to the surfaces of the wafers W, coating a resist film on each wafer W. The heating apparatus 14 heats the wafers W coated with resist and also the wafers W exposed to light. The developing apparatuses 15 rotate the light-exposed wafers W and apply developing liquid to the wafers W, thereby developing the resist film on each wafer W.

The wafer-processing apparatuses 9 to 15 are arranged close to one another, at appropriate positions, so that they occupy but a relatively small space and operate with high efficiency. Wafers W are brought into and out of the apparatuses 9 to 14 by means of the transport arms 3 and 6.

As shown in FIG. 1, the system 1 further comprises a casing 16. The casing 16 contains the cassette station 2, transport arms 3 and 6, transport mechanism 4, transport path 5, arm tracks 7 and 8, and wafer-processing apparatuses 9 to 15.

The resist-coating apparatuses 13 are identical, each being the first embodiment of the present invention. One of the apparatuses 13 will be described, with reference to FIGS. 1, 2 and 3.

As FIG. 1 shows, the resist-coating apparatus 13 comprises a casing 13*a*. As shown in FIGS. 2 and 3, the apparatus 13 has a processing chamber 21, a spin chuck 22, a chuck drive 23, drain pipes 24, and a drain tank 25, which are provided in the casing 13*a*. The spin chuck 22 is provided in the chamber 21. The chuck drive 23 is located below the chamber 21. The drain pipes 24 are provided in the bottom of the chamber 21. The drain tank 25 is located outside the chamber 21.

The spin chuck 22 is designed to hold a wafer W in a horizontal position by vacuum suction. The chuck 22 can be rotated by the chuck drive 23. The chuck drive 23 is, for example, a pulse motor. The drive 23 can rotate the spin chuck 22 at various controlled speeds. Gases can be exhausted from the center part of the bottom of the processing chamber 21 by a gas-exhaust means (not shown) such as a vacuum pump, which is provided outside the processing chamber 21. Resist liquid and solvent can be drained through the drain pipes 24 into the drain tank 25.

Figure 3:
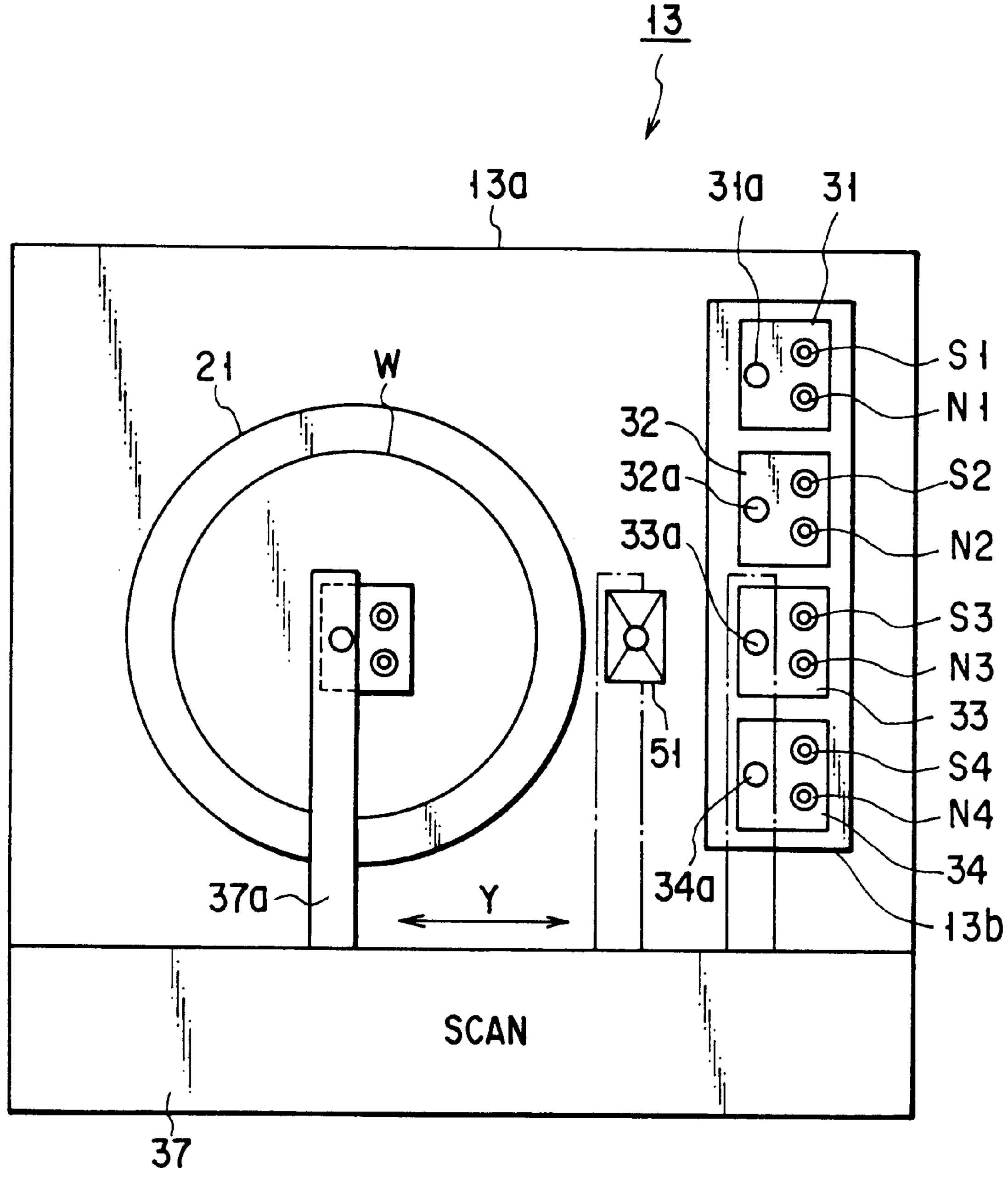
FIG. 3 is a plan view of the resist liquid coating apparatus shown in FIG. 2.

As seen from FIG. 3, the resist-coating apparatus 13 further comprises a holder 13*b*, four resist-applying nozzles N1 to N4, four solvent-applying nozzles S1 to S4, and four nozzle holders 31 to 34, all provided in the casing 13*a*. The resist-applying nozzles N1 to N4 are paired with the solvent-applying nozzles S1 to S4, respectively, constituting four nozzles units. The nozzle units are held by the nozzle holders 31 to 34, respectively. The nozzle holders 31 to 34 are held by the holder 13*b*. The holder 13*b* has through holes (not shown). The nozzles N1 to N4 and S1 to S4 are held in these through holes, each with its open end exposed to the solvent atmosphere in the housing 13*a*. As shown in FIG. 3, the nozzle holders 31 to 34 have pins 31*a*, 32*a*, 33*a* and 34*a*, respectively. The pins 31*a* to 34*a* can be held by a scan arm 37*a*, which will be described later.

The nozzle holders 31 to 34 are identical in basic structure. Only the nozzle holder 31 shown in FIG. 2 will be described. As shown in FIG. 2, a resist-supplying tube 41 is connected at one end to the resist-applying nozzle N1 and at the other end to a resist liquid source R1 which is located outside the casing 13*a*. A resist liquid is therefore supplied from the source R1 to the resist-applying nozzle N1 through the resist-supplying tube 41. A filter 42 is provided in the tube 41, for filtering out impurities such as particles from the resist liquid. Mounted on the tube 41 is a resist-supplying mechanism 43, such as a bellows pump, for supplying the resist liquid to the nozzle N1 at a predetermined flow rate.

Since the three other nozzle holders 32, 33 and 34 are identical to the first nozzle holder 31 in basic structure, three resist liquids can be applied independently to the wafer W from the nozzles N2, N3 and N4. Thus, the resist-coating apparatus 13 can coat the wafer W with four different resist liquids.

Two tubes 35*a* and 25*b* are connected to the nozzle holder 31. A temperature-controlling fluid is supplied to the holder 31 through the tube 35*a* and therefrom through the tube 35*b*. The fluid maintains at a desired temperature the resist liquid which flows through the resist-supplying tube 41 and is eventually applied to the wafer W from the resist-applying nozzle N1.

Figure 2:
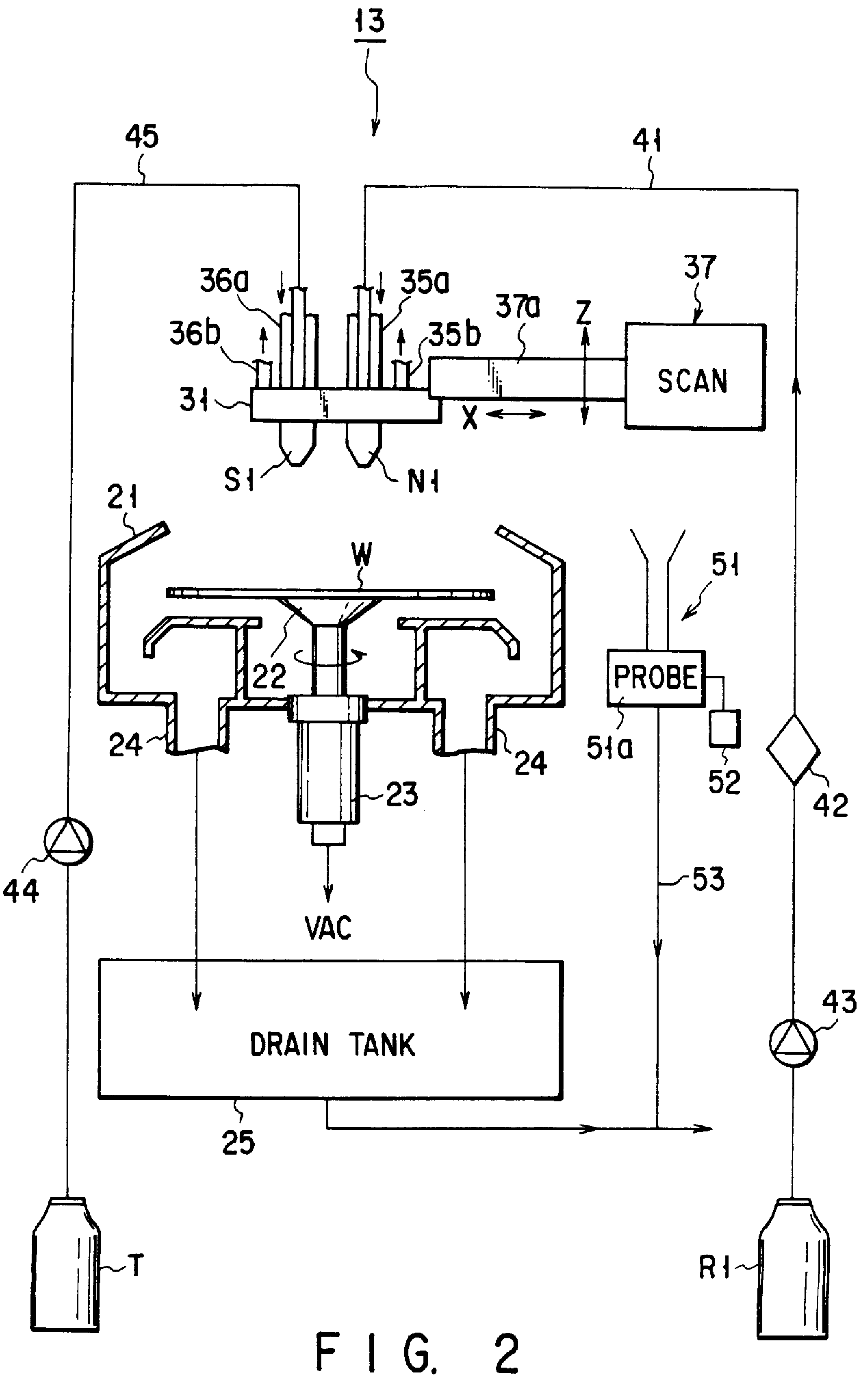
FIG. 2 is a schematic view showing the resist liquid coating apparatus according to the first embodiment of the invention.

As illustrated in FIG. 2, a solvent-supplying tube 45 is connected at one end to the solvent-applying nozzle S1 and at the other end to a solvent source T which is located outside the casing 13*a*. A solvent is therefore supplied from the source T to the solvent-applying nozzle S1 through the solvent-supplying tube 45. Mounted on the tube 45 is a solvent-supplying mechanism 44, such as a pump, for supplying the solvent to the solvent-applying nozzle S1. Two tubes 36*a* and 26*b* are connected to the nozzle holder 31. A temperature-controlling fluid is supplied to the holder 31 through the tube 36*a* and therefrom through the tube 36*b*. The fluid maintains at a desired temperature the solvent which flows through the solvent-supplying tube 45 and is eventually applied to the wafer W from the solvent-applying nozzle S1.

The nozzle holder 31 holding the resist-applying nozzle N1 and the solvent-applying nozzle S1 can be moved from the holder 13*b* to a desired position above the wafer W by the scan arm 37*a* of a scan unit 37. The scan unit 37 is so designed that the scan arm 37*a* can move in three-dimensional fashion, namely in X axis, Y axis and Z axis.

As mentioned above, the resist-applying nozzles N1 to N4 are paired with the solvent-applying nozzles S1 to S4, respectively, constituting four nozzles units. Instead, only the resist-applying nozzles N1 to N4 may be held by the nozzle holders 31 to 34, respectively, and the solvent-applying nozzles S1 to S4 may be replaced by a single solvent-applying nozzle which is secured to a certain part of the scan arm 37*a*.

As shown in FIGS. 2 and 3, the resist-coating apparatus 13 has a resist receptacle 51 which is located outside the processing chamber 21 and below the scan unit 37. The receptacle 51 is a pipe having a flaring open top. A probe 51*a* is connected to the lower end of the receptacle 51, for examining the resist liquid supplied to the resist receptacle 51. Connected to the probe 51*a* is a particle counter 52. The counter 52 is designed to apply, for example, a laser beam to the resist liquid in the probe 51*a*, thereby to count the particles existing in the resist liquid. The resist liquid can be drained from the probe 51*a* through a drain pipe 53, along with the resist liquid and solvent discharged from the drain tank 25.

In operation, a wafer W is placed on the spin chuck 22 located in the processing chamber 21. The spin chuck 22 automatically holds the wafer W by vacuum suction. The chuck drive 23 rotates the spin chuck 22, whereby the wafer W is rotated. Of the resist-applying nozzles N1 to N4, a nozzle Nx is selected to apply the desired resist liquid. The scan arm 37*a* is moved to the nozzle holder holding the nozzle Nx. The nozzle Nx selected may be, for example, the resist-applying nozzle N1. In this case, the arm 37*a* is moved to the nozzle holder 31, grasps the holder S1 and moves the same to a desired position above the wafer W. The solvent is first applied from the nozzle S1 and the desired resist liquid is then applied from the nozzle N1.

With the resist-coating apparatus 13 it is possible to count the number of particles existing in an unit amount of the desired resist liquid, before the wafer W is mounted and held on the spin chuck 22. More precisely, the scan arm 37*a* is moved to, for example, the nozzle holder 31 holding the resist-applying nozzle N1 (i.e., the selected nozzle Nx). The scan arm 37*a* grasps the holder 31 and moves it to a position right above the resist receptacle 51. The nozzle N1 applies the resist liquid into the receptacle 51 in a predetermined amount. The particle counter 52 counts the particles existing in the resist liquid in the probe 51*a*. After the counter 52 finishes counting the particles, the nozzle S1 applies the solvent into the receptacle 51, washing the receptacle 51 and removing the residual resist liquid therefrom.

If the number of the particles the counter has counted is equal to or smaller than a reference value, a wafer W is placed on the spin chuck 22, and the scan arm 37*a* moves the holder 31 to a position above the wafer W. The nozzle N1 applies the resist liquid to the wafer W which is rotating. If the number of the particles the counter has counted is greater than the reference value, an alarm device (not shown) provided outside the resist-coating apparatus 13 generates an alarm, and the scan gram 37*a* moves the holder 31 back to the holder 13*b*. In this case, the apparatus 13 performs no further operation until measures are taken to reduce the number of particles existing in the resist liquid.

Any one of the other resist-applying nozzles N2 to N4, for example the nozzle N2 held by the nozzle holder 32, may be connected to a source R1 of the desired resist liquid. If this is the case, the scan arm 37*a* moves the nozzle holder 31 back to the holder 13*b* at the same time the alarm device generates an alarm, and grasps the nozzle holder 32 and moves the same to the position right above the resist receptacle 51. Then, the nozzle N2 applies the same resist liquid into the receptacle 51 in the prescribed amount. The counter 52 counts the particles existing in the resist liquid in the probe 51*a*, to determine whether the resist liquid should be applied to a wafer W or not. While these steps are being carried out in sequence, the operator may repair the resist-supplying system connected to the nozzle N1 and including the filter 42 and the resist-supplying mechanism 43, thereby reducing the number of particles existing in the unit amount of the resist liquid supplied to the nozzle N1. Hence, the resist-coating apparatus 13 need not be stopped and can continuously apply the desired resist liquid to wafers W.

The components of the resist-coating apparatus 13 are automatically controlled by a controller (not shown) provided in the resist-coating and -developing system 1.

If it takes the counter 52 a considerably long time to count the particles existing in the resist liquid in the probe 51*a*, the counter 52 need not be operated every time the apparatus 13 coats the resist liquid on a wafer W. Rather, the counter 52 may count particles every time the apparatus 13 finishes coating of the liquid on a prescribed number of wafers W, or may count particles at regular intervals of several hours or several days.

As can be understood from the above, the amount of impurities (e.g., particles) contained in any resist liquid can be detected before the resist liquid is coated on wafers W. This ensures to form a high-quality resist film on a wafer W, which helps to provide a flawless circuit pattern on the wafer W.

Since the resist receptacle 51 is located outside the processing chamber 21, it is always away from the wafer W placed in the chamber 21. The resist liquid would not contaminate the spin chuck 22 provided in the chamber 21, while the liquid is being supplied from any resist-applying nozzle into the receptacle 51. To prevent the liquid from dripping down to the spin chuck 22, it is desirable to locate the receptacle 51 at a level below the top of the processing chamber 21. The receptacle 51 may be coupled to the holder 13*b*. In this case, the space in the casing 13*a* of the apparatus 13 can be smaller, and the liquid will have far less chance of dripping down to the chamber 21 or the spin chuck 22, because the holder 13*b* is remote from the processing chamber 21.

If the case where the resist receptacle 51 is coupled to the holder 13*b*, the scan arm 27*a* need not move the nozzle holders 31 to 34 from the holder 13*b* to a position above the resist receptacle 51. Thus, one of the nozzles N1 to N4 can apply an amount of the resist liquid into the receptacle 51 while any other resist-applying nozzle is applying the resist liquid onto the wafer W held on the spin chuck 22. While the resist liquid is being applied to several wafers W, one after another, an amount of the resist liquid to be applied to other wafers thereafter may be supplied into the receptacle 51 and the counter 52 counts the particles in the liquid in the probe 51*a*. The resist-coating can then be effected without a break.

As described above, the receptacle 51 is remote from the holder 13*b* in the resist-coating apparatus 13 illustrated in FIGS. 2 and 3. Even in the apparatus 13, the scan arm 37*a* may move any nozzle holder holding the resist-applying nozzle not applying the resist liquid to the wafer W mounted on the chuck 22 from the holder 13*b* to the position above the receptacle 51. The particles in the resist liquid can then be counted at any time desired.

In order to maintain the resist receptacle 51 clean enough for more accurate counting of particles, the open top of the receptacle 51 may be kept closed to all time, but when the resist liquid is supplied into the receptacle 51 in the predetermined amount. For the same purpose, a cleaning unit may be connected to the receptacle 51, for applying a solvent into the receptacle 51 to remove the residual resist liquid therefrom. Furthermore, a pump may be provided on the drain pipe 53 to drain the resist liquid and the solvent from the probe 51*a*.

A resist-coating apparatus 140 according to the second embodiment of the present invention will be described, with reference to FIGS. 4 to 6.

Figure 4:
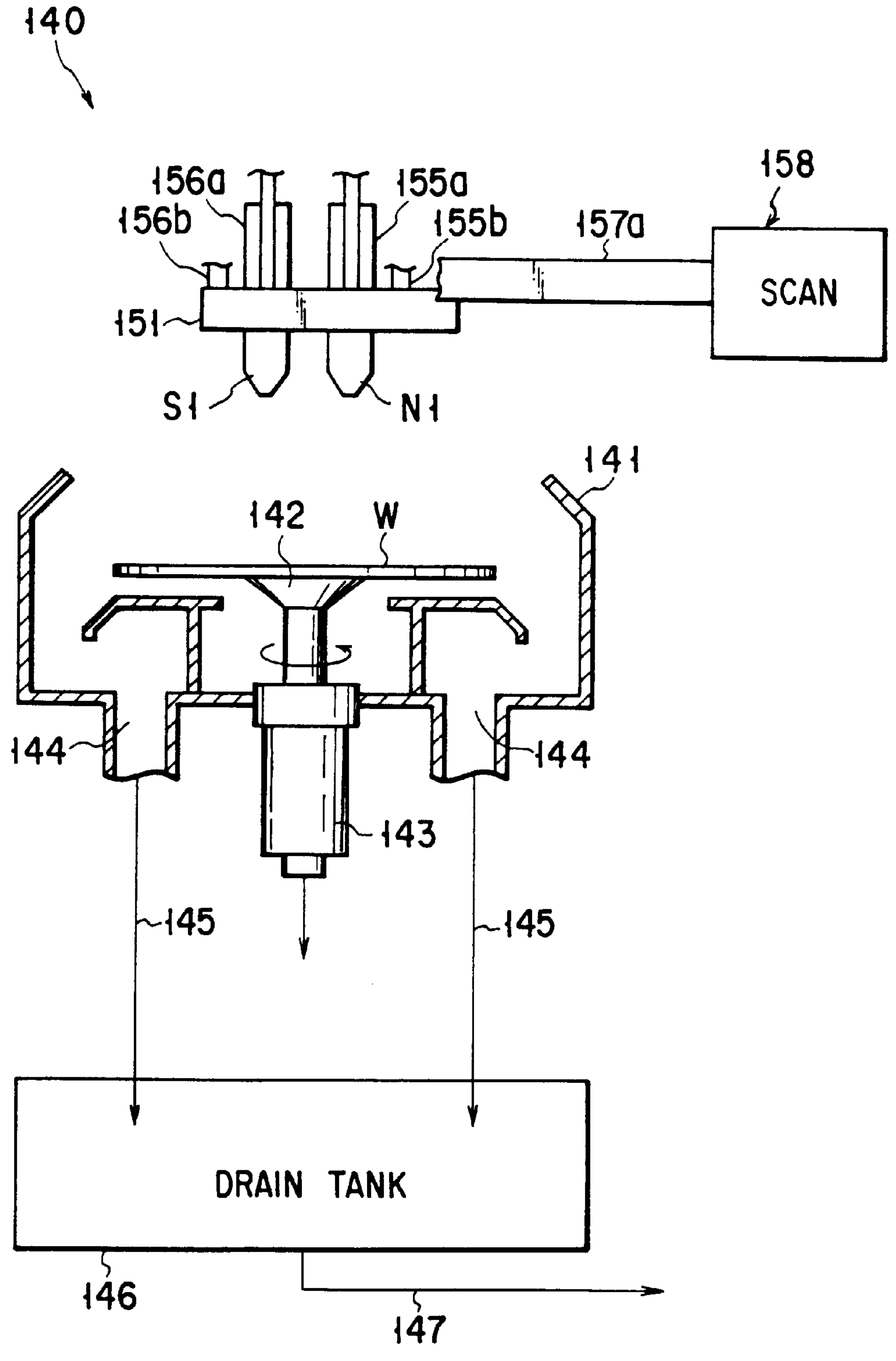
FIG. 4 is a schematic view showing a resist liquid coating apparatus which is the second embodiment of the present invention.
Figure 5:
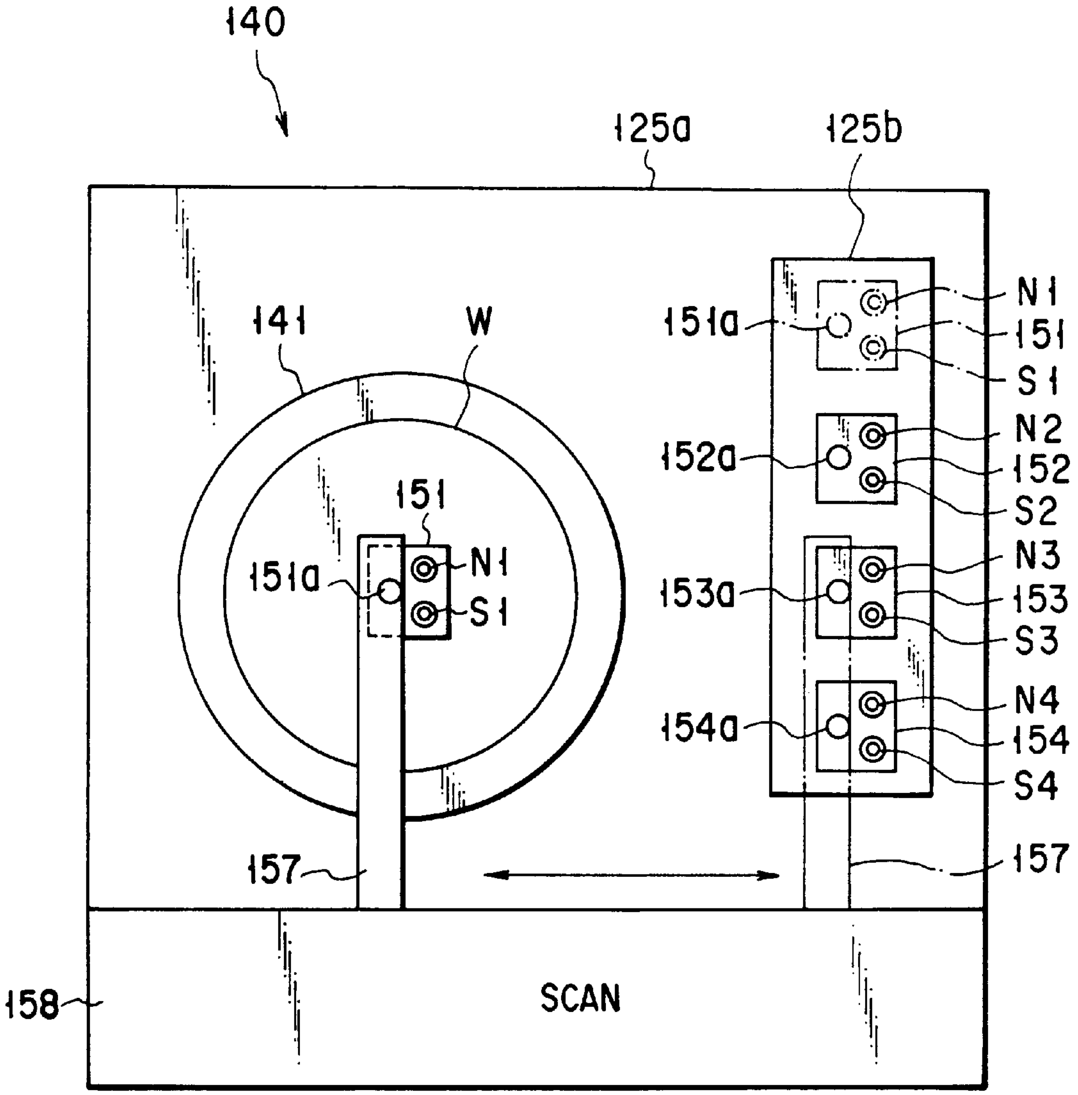
FIG. 5 is a plan view of the resist liquid coating apparatus shown in FIG. 4.

As shown in FIGS. 4 and 5, the resist-coating apparatus 140 comprises a casing 125*a*, a processing chamber 141, a spin chuck 142 a chuck drive 143, drain pipes 144, and a drain tank 146. The chamber 141, the chuck 142, drive 143, pipes 144 and tank 146 are provided in the casing 125*a*. The spin chuck 142 is provided in the chamber 141. The chuck drive 143 is located below the chamber 141. The drain pipes 144 are provided in the bottom of the chamber 141 and connected to the drain tank 146. The tank 146 is located outside the chamber 21.

The spin chuck 142 is designed to hold a wafer W in a horizontal position by vacuum suction. The chuck 142 can be rotated by the chuck drive 143. The chuck drive 143 is, for example, a pulse motor. The drive 143 can rotate the spin chuck 142 at various controlled speeds. Gases can be exhausted from the center part of the bottom of the processing chamber 141 by a gas-exhaust means (not shown) such as a vacuum pump, which is provided outside the processing chamber 141. Resist liquid and solvent, which have been scattered from the wafer W being coated with the resist liquid, can be drained through the drain pipes 144 into the drain tank 145. A drain pipe 147 is connected to the drain tank 146. The resist liquid and the solvent can be drained through the drain pipe 147 from the tank 147, and ultimately from the resist-coating apparatus 140.

As seen from FIG. 15, the resist-coating apparatus 140 further comprises a holder 125*b*, four resist-applying nozzles N1 to N4, four solvent-applying nozzles S1 to S4, and four nozzle holders 151 to 154, all provided in the casing 125*a*. The resist-applying nozzles N1 to N4 are paired with the solvent-applying nozzles S1 to S4, respectively, constituting four nozzles units. The nozzle units are held by the nozzle holders 151 to 154, respectively. The nozzle holders 151 to 154 are held by the holder 125*b*. The holder 125*b* has through holes (not shown). The nozzles N1 to N4 and S1 to S4 are held in these through holes, each with its open end exposed to the solvent atmosphere in the housing 125*a*. As will be described later, four resist-supplying pipes are connected to the nozzles N1 to N4, respectively. Four different resist liquids can therefore be applied to the wafer W held on the spin chuck 142.

As mentioned above, the resist-applying nozzles N1 to N4 are paired with the solvent-applying nozzles S1 to S4, respectively, constituting four nozzles units. Instead, only the resist-applying nozzles N1 to N4 may be held by the nozzle holders 151 to 154, respectively, and the solvent-applying nozzles S1 to S4 may be replaced by a single solvent-applying nozzle which is secured to a certain part of a scan arm 157*a* (later described).

As shown in FIG. 5, the nozzle holders 151 to 154 have pins 151*a*, 152*a*, 153*a* and 154*a*, respectively. The pins 151*a* to 154*a* can be held by the scan arm 157*a*. The scan arm 157*a* can be driven by a scan unit 157, in three-dimensional fashion, namely in X axis, Y axis and Z axis. In operation, the scan unit 157 moves the scan arm 157*a* to any selected one of the nozzle holders 151 to 154. Thus moved, the scan arm 157 grasps, for example, the pin 151*a* of the nozzle holder 151. The scan unit 157 further moves the scan arm 157*a* to a position above the wafer W mounted on the spin chuck 142. The selected nozzle holder 151 is thereby positioned above the wafer W.

As shown in FIG. 4, four tubes 155*a*, 155*b*, 156*a* and 156*b* are connected to each nozzle holder. A temperature-controlling fluid is supplied to the nozzle holder through the tube 155*a* and therefrom through the tube 155*b*. The fluid maintains at a desired temperature the resist liquid to be applied through the resist-applying nozzle to the wafer W. Similarly, a temperature-controlling fluid is supplied to the nozzle holder through the tube 156*a* and therefrom through the tube 156*b*. This fluid maintains at a desired temperature the solvent to be applied through the solvent-applying nozzle to the wafer W.

A system for supplying resist liquids to the resist-applying nozzles N1 to N4 of the resist-coating apparatus 140 will be described with reference to FIG. 6. FIG. 6 shows not only the resist-supplying system, but also a counter for counting particles existing in the resist liquid and a system for supplying a cleaning solution.

Figure 6:
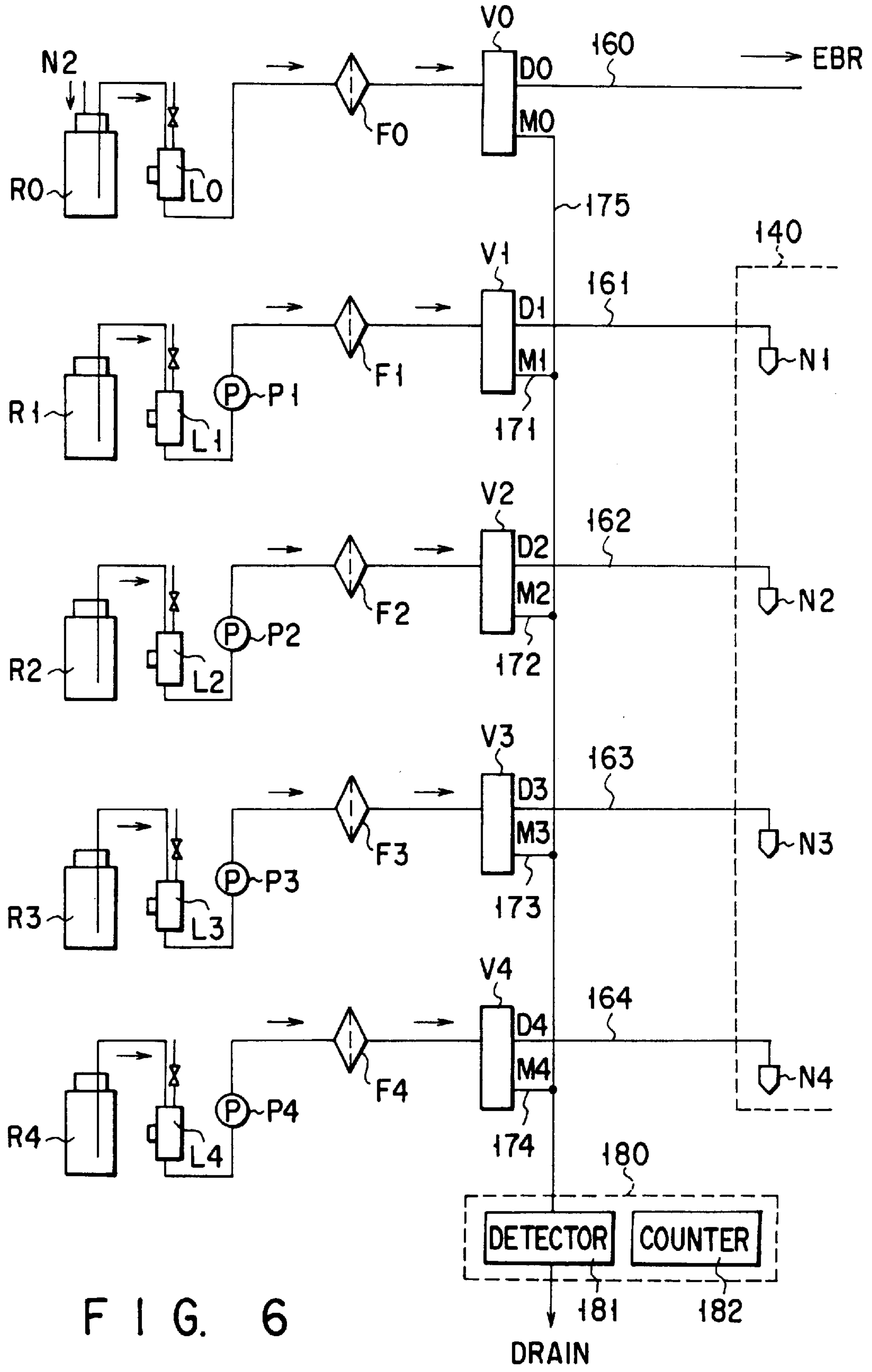
FIG. 6 is a diagram illustrating the resist liquid supplying system, pipes used to count particles in the resist liquid and washing liquid supplying system, all incorporated in the apparatus shown in FIG. 4.

As seen from FIG. 6, four resist-supplying pipes 161, 162, 163 and 164 are connected at one end to the resist-applying nozzles N1 to N4, and at the other end to resist reservoirs R1, R2, R3 and R4, respectively.

The resist-supplying pipes 161 to 164 extend parallel to one another. Meters L1 to L4 are mounted on the pipes 161 to 164, respectively, for detecting the amounts of the resist liquids remaining in the reservoirs R1 to R4. Pumps P1 to P4 are provided on the pipes 161 to 164, respectively. Further, filters F1 to F4 are provided on the pipes 161 to 164, respectively. Still further, air-operated valves V1 to V4 are provided on the resist-applying pipes 161 to 164, respectively. Connected to the air-operated valves V1 to V4 are sampling pipes 171 to 174 which branch from the resist-applying pipes 161 to 164, respectively. Each air-operated valve has two outlet ports D and M. The first outlet port D is connected to the resist-supplying pipe, while the second outlet port M is connected to the sampling pipe.

Usually, the first outlet ports D1 to D4 of the air-operated valves V1 to V4 are open and the second outlet ports M1 to M4 are closed, whereby the resist liquids flow through the pipes 161 to 164 to the resist-applying nozzles N1 to N4, respectively. To count the particles in the resist liquids, whenever necessary, the second outlet ports M1 to M4 are opened, whereby the resist liquids flow through into the sampling pipes 171 to 174, respectively. Since the valves V1 to V4 are located downstream of the filters F1 to F4, it can be readily determined how much particles have increased in numbers in the resist liquid due to the decrease in the efficiency of the filter.

The sampling pipes 171 to 174 are connected to one pipe 175. The pipe 175 is connected at the downstream end to a particle counter 180. The particle counter 180 comprises a particle-detecting section 181 and a particle-counting section 182. The particle-detecting section 181 has a light source and a sensor. The resist liquids can be supplied to the particle-detecting section 181 from the resist-supplying pipes 161 to 164 through the sampling pipes 171 to 174 and then through the pipe 175. The section 181 detects the particles in any resist liquid supplied to it. The section 182 counts the particles the section 181 has detected. The resist liquid is then drained from the particle-detecting section 182 through the drain pipe 147.

As shown in FIG. 6, a system for supplying a cleaning solution is provided, opposing the particle counter 180. This system comprises a solution-supplying pipe 160, a solution reservoir R0, a meter L0, a filter F0, and an air-operated valve V0. The solution-supplying pipe 160 extends parallel to the resist-supplying pipe 161. The solution reservoir R0 is connected to the upstream end of the pipe 160. The tank 160 contains a cleaning solution, which is supplied through the pipe 160 under the pressure of $N_2$ gas. The solution may be forced through the pipe 160 by means of a pump, not by the pressure of $N_2$ gas. The meter L0, the filter F0 and the valve V0 are provided on the solution-supplying pipe 160, in the order mentioned from the upstream end of the pipe 160.

The meter L0 is provided to detect the amount of the cleaning solution remaining in the reservoirs R0. The filter F0 is designed to filter out particles from the cleaning solution.

The air-operated valve V0 has two outlet ports D0 and M0. The second outlet port M0 is connected to the pipe 175. Usually, the first outlet ports D0 is opened and the second outlet port M0 is closed. To supply the cleaning solution through the pipe 175, the first outlet ports D1 to D4 are closed and the second outlet ports M1 to M4 are opened, whereby the cleaning solution flows to the particle-detecting section 181 of the particle counter 180 through the pipe 175, passing the nodes of the pipe 175 and the sampling pipes 171 to 174. The optical cell and the like incorporated in the particle-detecting section 181 is cleaned with the cleaning solution. The cleaning solution is discharged after use, from the section 181 through the drain pipe 174.

To apply the resist liquid to the wafer W on the spin chuck 142 from the nozzle N1, for example, the pump P1 draws the resist liquid from the reservoir R1 via the meter L1. When a resist-applying signal is supplied to the valve V1, the pump P1 supplies the resist liquid to the valve V1 through the filter F1. At the same time the first outlet port D1 of the valve V1 is opened, whereby the resist liquid is supplied from the first outlet port D1 to the nozzle N1 via the resist-supplying pipe 161. The nozzle N1 applies the resist liquid to the wafer W held on the spin chuck 142. After the resist liquid has been applied to the wafer W in the prescribed amount, the first outlet port D1 of the valve V1 is closed. The pump P1 draws the resist liquid from the reservoir R1 so that the resist liquid may be supplied to the nozzle N1 and may be applied to the next wafer W.

The resist liquid is applied from the other resist-applying nozzles N2, N3 and N4, exactly in the same way as from the resist-applying nozzle N1.

Figure 7:
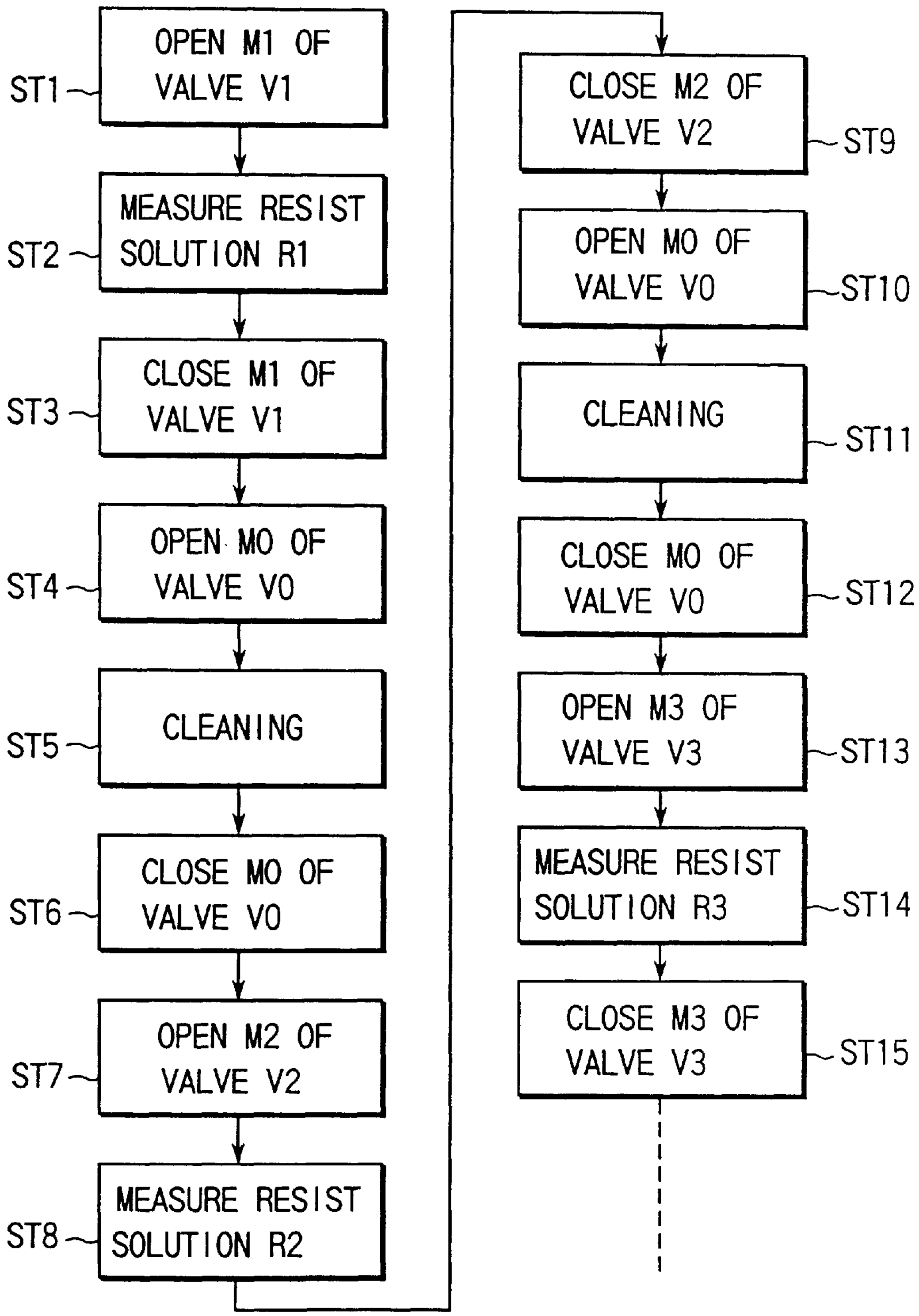
FIG. 7 is a flow chart explaining how the particles in the liquid are counted and how the particle-detecting section of a particle counter is cleaned.

How the particles in the resist liquid are counted in the resist-coating apparatus 140 will be explained, with reference to the flow chart of FIG. 7.

To count the particles existing in the resist liquid flowing through resist-supplying pipe 161, a count-starting signal is supplied to the valve V1 after the pump P1 has drawn the resist liquid from the reservoir R1 via the meter L1, and the second outlet port M1 of the valve V1 is opened (Step ST1). The resist liquid is thereby supplied from the second outlet port M1 to the particle-detecting section 181 of the particle counter 180 through the sampling pipe 171 and the pipe 175. The section 181 detects the particles existing in the resist liquid (Step ST2). Thereafter, the second port M1 of the valve V1 is closed, and the pump P1 draws the resist liquid from the reservoir R1 (Step ST3). In order to achieve accurate counting of particles, the pipe 175 must be filled up with the resist liquid supplied from the reservoir R1. It is therefore desired that the sequence of Steps ST1 to ST3 be carried out several times.

Upon completion of the counting of particles, the resist liquid is drained from the pipe 175. Then, the particle-detecting section 181 (particularly, the optical cell) of the counter 180 is cleaned. More precisely, the second outlet port M0 of the air-operated valve V0 provided on the solution-supplying pipe 160 is opened(Step ST4). The cleaning solution is thereby supplied to the particle-detecting section 181 under the $N_2$ gas pressure, through the filter F0, the second outlet port M0 of the valve V0 and the pipe 175. The pipe 157 and the section 181 are cleaned with the cleaning solution (Step ST5). Upon completion of the cleaning, the second port M0 of the air-operated valve V0 is closed (Step ST6).

To count the particles existing in the resist liquid flowing through resist-supplying pipe 162, a count-starting signal is supplied to the valve V2 after the pump P2 has drawn the resist liquid from the reservoir R2 via the meter L2, and the second outlet port M2 of the valve V2 is opened (Step ST7). The resist liquid is thereby supplied from the second outlet port M2 to the particle-detecting section 181 of the particle counter 180 through the sampling pipe 172 and the pipe 175. The section 181 detects the particles existing in the resist liquid (Step ST8).

Upon completion of the counting of particles, the second outlet port M2 of the air-operated valve V2 is closed (Step ST9). Next, the first outlet port M0 of the air-operated valve V0 mounted on the pipe 160 is opened (Step ST10). Further, the particle-detecting section 181 (particularly, the optical cell) of the counter 180 is cleaned (Step ST11). Upon completion of the cleaning, the second port M0 of the air-operated valve V0 is closed (Step ST12).

The particles in the resist liquid flowing through resist-supplying pipe 163 are then detected and counted (Steps ST13 to ST15), in the same way as those existing in the resist liquid flowing through the pipe 161.

Thereafter, the particles in the resist liquid flowing through resist-supplying pipe 164 are detected and counted, in the same way as those existing in the resist liquid flowing through the pipe 161.

The resists liquids flowing through the resist-supplying pipes 161, 162, 163 and 164 need not be subjected to the particle-counting process in the order specified above. Rather, they can automatically be subjected to the process in any other order and at any desired intervals, in accordance with an operation-sequence program stored in a memory. Whenever the number of the particles counted is greater than a reference value, an alarm device (not shown) generates an alarm.

The solution-supplying system including the solution-supplying pipe 160 can clean both the pipe 175 and the particle-detecting section 181 whenever necessary. The resist hardly remains in the optical cell of the section 181 or contaminates the section 181. The particle counter 180 can therefore accurately count the particles which exist in the resist liquid flowing through each of the resist-supplying pipes 161 to 164. The counter 180 is an efficient device since it can count the particles existing in the resist liquid flowing through a plurality of resist-supplying pipe, i.e., the pipes 161 to 164.

The resist liquids may have different viscosities. Even in this case, each resist liquid can be supplied to the particle-detecting section 181 in an appropriate amount, provided that the pumps P1 to P4 are of the type which can supply resist liquid at a different flow rates. Needless to say, the pump provided on each resist-supplying pipe can supply resist liquid to the associated resist-applying nozzle in such a flow rate that the nozzle applies the liquid in a desired amount to the wafer W.

The solution-supplying pipe 160 is located farther from the particle counter 180 than the resist-supplying pipes 161 to 164. The cleaning solution supplied from the line 160 to the pipe 175 can therefore clean the nodes of the pipe 175 and the sampling pipes 171 to 174.

Two or more solution-supplying pipes may be used, not one pipe only, for supplying different types of cleaning solutions to the particle-detecting section 181 through the pipe 157. If so, one of the clearing solutions can be selected in accordance with which type of a resist liquid has been supplied to the section 181, so that the pipe 175 and the section 181 may be cleaned efficiently and thoroughly.

Figure 8:
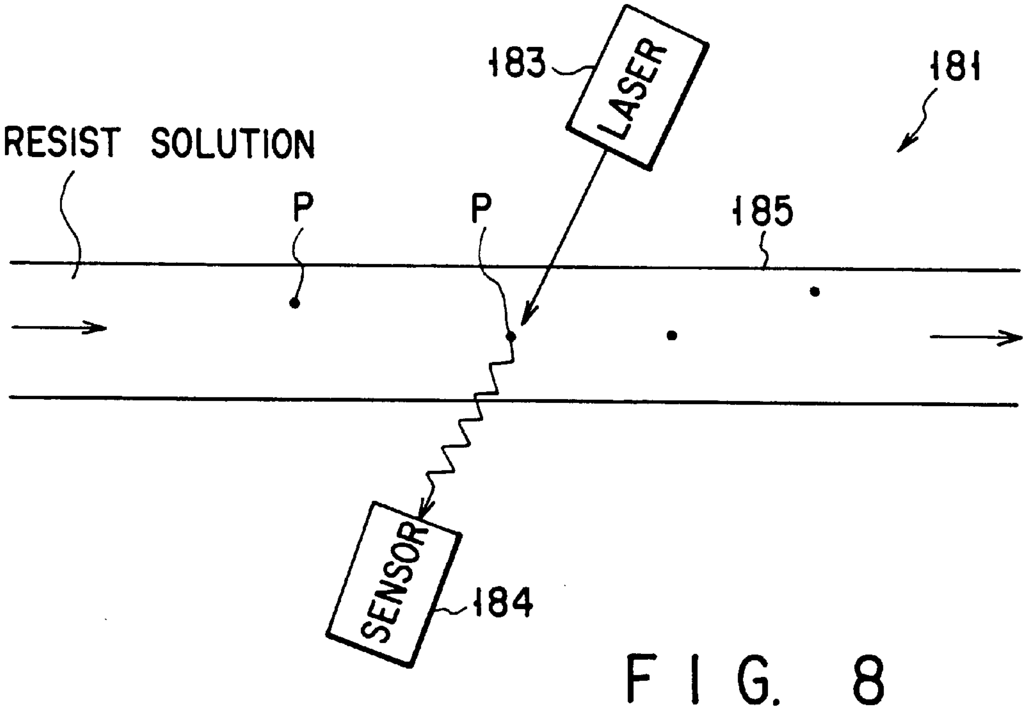
FIG. 8 is a schematic diagram showing the particle-detecting section of the particle-counting apparatus.

The particle counter 180 will be described in detail, with reference to FIG. 8.

As described above, the particle counter 180 comprises the particle-detecting section 181 and the particle-counting section 182. As shown in FIG. 8, the section 181 has a laser 183, a sensor 184, and an optical cell 185. The laser 183 and the sensor 184 oppose each other. The cell 185 is located between the laser 183 and the sensor 184. To count the particles existing in the resist liquid supplied into the optical cell 185, the laser 183 emits a laser beam to the cell 185, illuminating the particles in the resist liquid. The sensor 184 detects the particles thus illuminated and generates signals which correspond to the particles detected. The signals are input to the particle-counting section 182. The section 182 processes the signals, generating data representing the number of the particles the sensor 184 has detected.

When the laser beam is applied to the resist liquid in the optical cell 185, the resin component of the resist liquid emits light. The light emitted from the resin component lowers the accuracy of counting particles which have a size less than, for example, 0.25 μm. Influenced by this light, the sensor 184 makes counts a, b and c of particles having sizes less than size L, which are greater than the numbers of the particles of these sizes actually existing in the resist liquid, as is seen from FIG. 9. (The shaded region in FIG. 9 indicates the counts the sensor 184 provides of non-existent particles, due to the light from the resin component.) Thus, the sensor 184 cannot accurately count particles having a size less than size L.

Figure 9:
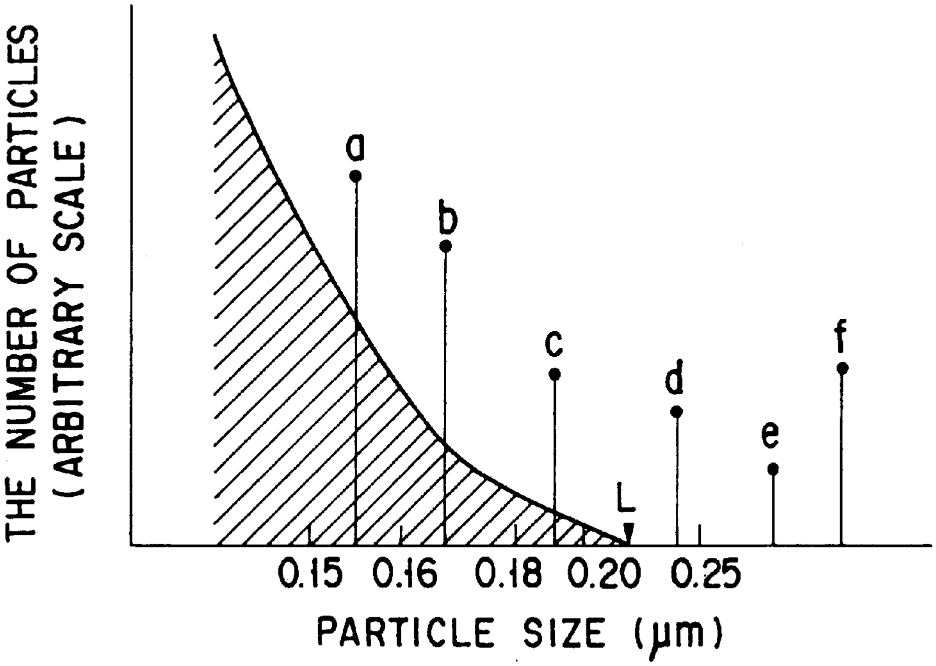
FIG. 9 is a graph representing the influence the resist liquid imposes on the light emission from the resist liquid when the particle-counting apparatus counts the particles existing in the resist liquid.

As can be understood from FIG. 9, the sensor 184 can make accurate counts d, e and f of the particles having sizes greater than size L, not influenced by the light emitted from the resin component of the resist liquid. Therefore, the counts the sensor 184 makes of only those particles which have a size equal to or greater than L may be used to determine whether or not the resist liquid contain an excessive number of particles, not using the counts of the particles having a size less than L. The threshold particle size L depends on the type of the resist liquid examined. Thus, the parameters set in the particle-counting section 182 for processing the signals generated by the sensor 184 should be changed in accordance with the type of the resist liquid.

Generally, particles assume so-called "logarithmic normal distribution" in terms of their sizes. The smaller the particles, the greater number of them. It is therefore necessary to count small particles in resist liquid, as well as large ones, in order to determine accurately whether or not the liquid contains too many particles. If the counts a, b and c the sensor 184 makes of particles having sizes less than size L and which are influenced by the light emitted from the resin component of the resist liquid are not considered, as mentioned above, it will be impossible to correctly determine whether the liquid contain an excessive number of particles.

Figure 10:
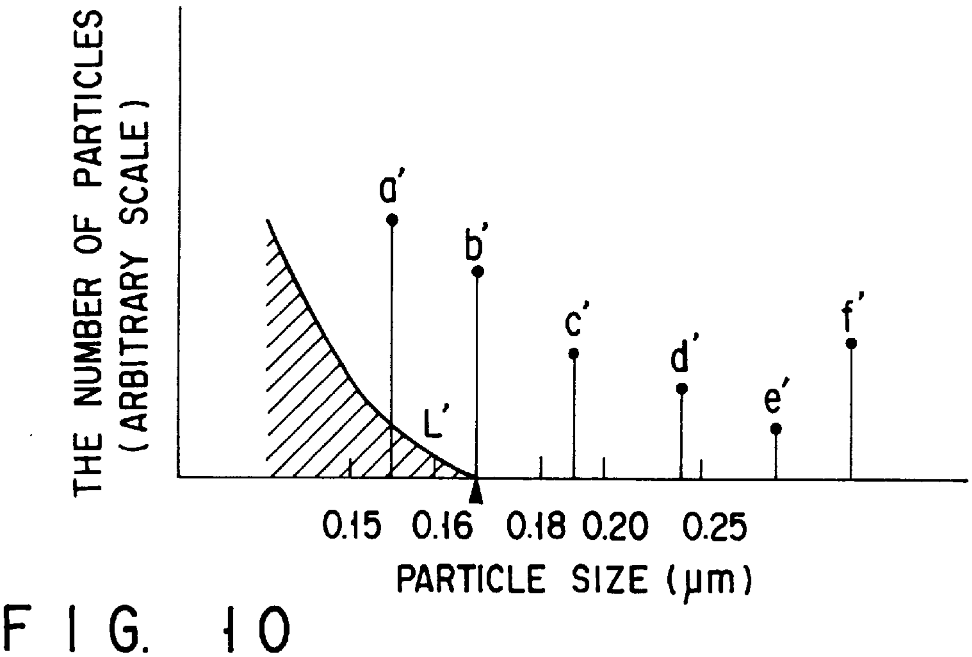
FIG. 10 is a graph depicting the influence the resist liquid imposes on the light emission from the resist liquid when the sensor used in the particle-counting apparatus is set at a low sensitivity.

In the present embodiment, the sensitivity of the sensor 184 is reduced. As a result, the counts it makes of relatively small particles are less influenced by the light emitted from the resin component of the resist liquid, as is illustrated in FIG. 10. It is only the particles having a size less than size L' which is less than size L. The size L' is, for example, 0.16 μm. The sensitivity of the sensor 184 may be reduced to the sensitivity to detect particles having a size equal to or greater than 0.16 μm. Although the counts a' to f' the sensor 184 makes of the particles over the entire range of size are relatively reduced, they can be corrected on the basis of the counts the sensor 184 makes of particles existing in a liquid filled in the optical cell 185, such as pure water, which contains nothing which emits light when the laser beam is applied to the liquid.

Figure 11A:
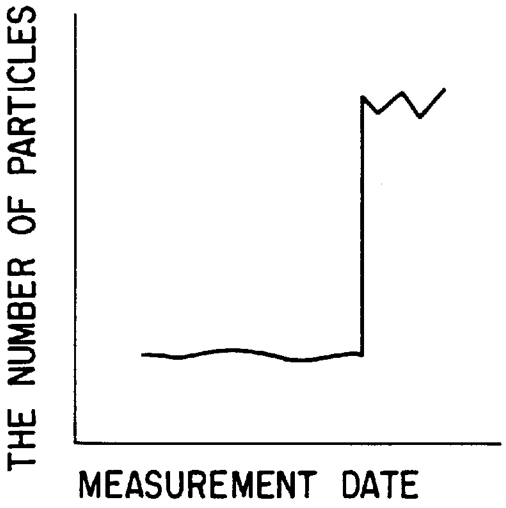
FIGS. 11A and 11B are graphs showing how the particles increased in numbers with time, as counted by the particle-counting apparatus.
Figure 11B:
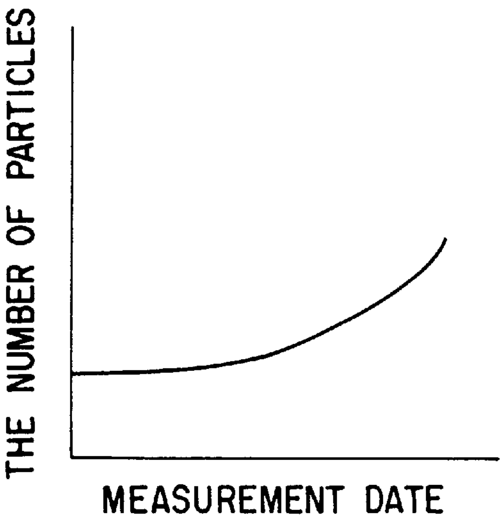

It is known that particles increases with time in the resist liquid in two distinctive manners, as is illustrated in FIGS. 11A and 11B. If the particles increases abruptly as shown in FIG. 11A, this is perhaps because the resist liquid in the reservoir has been contaminated or because any devices provided on the resist-supplying pipe malfunctions. In this event, the resist-coating apparatus 140 must be stopped immediately, and appropriate measures must be taken to reduce the number of particles. If the particles increases gradually as shown in FIG. 11B, this is probably because the filter or the pump provided on the resist-supplying pipe, or both have become less efficient over a long use. In this case, the either the filter or the pump, or both, must be replaced by new ones. In whichever manner the particles increase, the alarm device (not shown) gives an alarm to the operator or the host computer which controls the sag resist-coating and -developing system 1 (FIG. 1) when the number of the particles counted by the sensor 184 exceeds the reference value.

The present invention is not limited to the embodiments described above. Rather, various changes and modifications can be made. For instance, the resist-coating apparatus according to the invention may have only one resist-applying nozzle. Further, the piping system for supplying resist liquids and cleaning solution is not limited to the one shown in FIG. 6. Still further, the resin liquid may be applied to LCD glass substrates, instead of semiconductor wafers W.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An apparatus for coating a film on a substrate, comprising:
   - a liquid-applying member configured to apply a coating liquid to the substrate located at a first position;
   - a receptacle located at a second position which is spaced apart from the first position and configured to receive the coating liquid applied from the liquid-applying member;
   - a mechanism configured to move the liquid-applying member at least between the first position and the second position; and
   - a detecting device coupled to said receptacle and configured to detect impurities contained in the coating liquid applied into said receptacle.

2. An apparatus according to claim 1, further comprising a cleaning unit including a portion exterior to said receptacle configured to apply a cleaning liquid to said receptacle and a passage extending from at least said receptacle to said detecting device, wherein the coating liquid applied to the receptacle is further applied to the detector device by said passage.

3. An apparatus for coating a film on a substrate, comprising:
   - a liquid-applying member configured to apply a coating liquid from a source to said substrate;
   - a detecting device configured to detect impurities contained in the coating liquid;
   - a first pipe arrangement configured to selectively couple said source of the coating liquid to said liquid-applying member;
   - a second pipe arrangement configured to selectively couple said source of the coating liquid to said detecting device; and source of the coating liquid between said liquid-applying member and said detecting device.

4. An apparatus according to claim 3, further comprising a cleaning unit coupled to said second pipe arrangement and configured to provide a cleaning liquid to a passage in said second pipe arrangement leading to said detecting device.

5. A coating apparatus comprising:

a coating section configured to coat a resist liquid on an object;

a resist liquid source;

a resist-supplying pipe configured to supply the resist liquid from said resist liquid source to said coating section;

a sampling pipe coupled to said resist-supplying pipe at a node;

a valve provided at said node and configured to direct the resist liquid flow from a passage leading to said coating section into said sampling pipe;

a particle-counting device coupled to said sampling pipe and arranged to count particles existing in the resist liquid supplied from said sampling pipe; and a cleaning unit coupled to the sampling pipe and arranged to supply a cleaning solution to said particle-counting device.

6. An apparatus according to claim 5, wherein said particle-counting device has a particle-detecting section including a light sensor having a sensitivity adjusted to compensate for inaccurately detected particles, said sensor having an output coupled to a particle-counting section configured to set parameters for processing the sensor output based on resist liquid type.

7. An apparatus according to claim 5, wherein said sensor has such a sensitivity as to detect particles having a size equal to or greater than 0.16 $\mu$m.

8. An apparatus according to claim 5, further comprising a filter provided so as to filter the resist liquid flowing through said resist-supplying pipe and then through the node.

9. A coating apparatus comprising:

a coating section configured to coat a resist liquid on an object;

a resist liquid source;

a plurality of resist-supplying pipes configured to supply the resist liquid from said resist liquid source to said coating section;

a plurality of sampling pipes coupled to said resist-supplying pipes at respective nodes;

a plurality of valves provided at said respective nodes and configured to divert supply of the resist liquid from said coating section into a corresponding respective sampling pipe;

a measuring pipe coupled to each respective sampling pipe;

a particle-counting device connected to said measuring pipe and arranged to count particles existing in the resist liquid supplied from each said respective sampling pipe; and a cleaning unit coupled to the measuring pipe and arranged to supply a cleaning solution to said particle-counting device through said measuring pipe.

10. An apparatus according to claim 9, wherein said particle-counting device has a particle-detecting section including a light sensor having sensitivity adjusted to compensate for inaccurately detected particles, said sensor having an output coupled to a particle counting section configured to set parameters for processing the sensor output based on resist liquid type.

11. An apparatus according to claim 9, wherein said sensor has such a sensitivity as to detect particles having a size equal to or greater than 0.16 $\mu$m.

12. An apparatus according to claim 9, further comprising a plurality of filters provided so as to filter the resist liquid flowing through respective said resist-supplying pipes and then through the respective nodes.

13. A coating apparatus comprising:

a coating section configured to coat a resist liquid on an object;

a resist liquid source;

a resist-supplying pipe configured to supply the resist liquid from said resist liquid source to said coating section;

a sampling pipe coupled to said resist-supplying pipe at a node;

a valve provided at said node and configured to divert supply of the resist liquid from a passage leading to said coating section to said sampling pipe; and a particle-counting device coupled to said sampling pipe and arranged to count particles existing in the resist liquid supplied from said sampling pipe, said particle-counting device having a particle-detecting section including a light sensor having a sensitivity adjusted to compensate for inaccurately detected particles, said sensor having an output coupled to a particle-counting section configured to set parameters for processing the sensor output based on resist liquid type.

14. An apparatus according to claim 13, wherein said sensor has such a sensitivity as to detect particles having a size equal to or greater than 0.16 $\mu$m.

15. An apparatus according to claim 13, further comprising a filter provided so as to filter the resist liquid flowing through said resist-supplying pipe and then through the node.

16. A particle-counting apparatus comprising:

a particle-detecting section including a light sensor having a sensitivity adjusted to compensate for inaccurately detected particles in a resist liquid; and a particle-counting section receiving a sensor output and processing it with parameters that are set based upon type of resist liquid present in said particle-detecting section.

17. An apparatus according to claim 16, wherein said sensor has such a sensitivity as to detect particles having a size equal to or greater than 0.16 $\mu$m.

* * * * *